Dec. 7, 1937.   J. ENGLER ET AL   2,101,386
SUBMARINE SIGNALING CABLE
Filed June 16, 1933
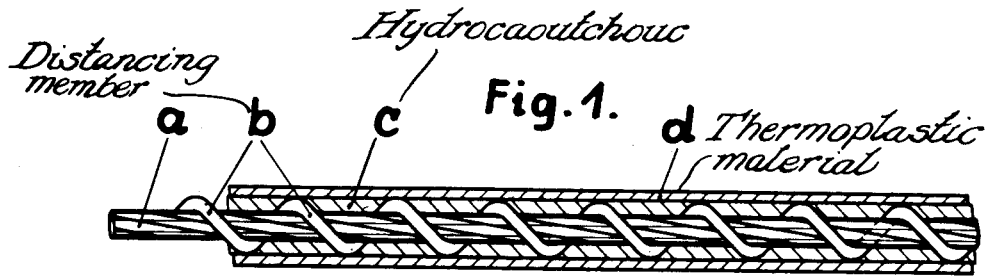
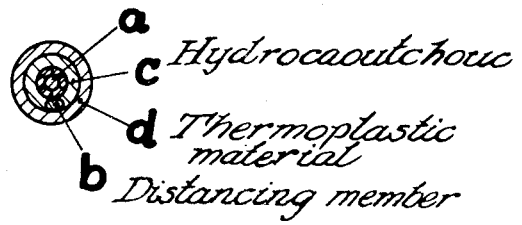
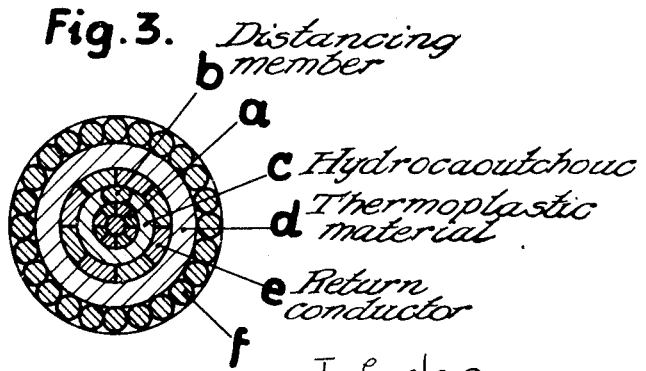

UNITED STATES PATENT OFFICE 2,101,386

SUBMARINE SIGNALING CABLE

Julius Engler and Ernst Studt, Nordenham, Germany, assignors to Norddeutsche Seekabelwerke A. G., Nordenham, Germany Application June 16, 1933, Serial No. 676,196
In Germany June 25, 1932

1 Claim. (Cl. 173—264)

For the insulation of submarine cables, only thermoplastic insulating substances such as gutta percha, balata, rubber and the like, or mixtures thereof have been used in addition to the paper lead sheath insulation. With these insulating materials it is possible to make a core covering which is mechanically satisfactory but the electrical properties, more particularly the dielectric constants and the angle of loss of these materials, still leave something to be desired.

The present invention relates to a submarine cable in which, in addition to the above-mentioned thermoplastic insulating materials, other materials are employed for constructing the cores which have more favourable electrical properties but which, on account of their consistency, are not themselves suitable for making a cable insulation which will retain its shape. These include insulating materials which are liquid, viscous or balsam-like, for example hydrocaoutchouc, swelling caoutchouc with high oil content, wax and the like.

The insulating materials of good electrical quality are applied directly on the conductors because their good electrical properties have a more favourable effect in this arrangement. For shutting out the sea-water a covering of thermoplastic material, for example, gutta percha or balata or mixtures thereof with rubber and wax is then applied. It is advisable to add hardening agents to the outer covering in order to improve its mechanical properties. Suitable substances for this purpose are certain artificial resins with good electrical properties, for example polymerization products of aryl olefines, more particularly polystyrol.

In order to keep the conductors in the middle of the liquid insulating material, a distancing member is provided which, for example, may be a cord laid round the conductors with a long pitch or a network of single cords. The distancing member consists of pure polystyrol which is preferably made in the form of a cord by drawing out from the artificial mass, and is applied to the conductor in a heated state. If necessary, there may be applied a further band of artificial material made by the same method in order to strengthen the outer covering. The following electrical values were obtained with a core, the distancing member of which consisted of polystyrol and the insulating layer of synthetic hydrocaoutchouc and the outer layer of hardened gutta percha.

Tangent of the angle of loss $\delta = 0.8 \cdot 10^{-3}$
Dielectric $\epsilon = 2.3$.

The new insulation is suitable for cables with one or more cores. In cables with more than one core, the separate cores provided with the distancing material can be twisted and provided with a common insulating covering.

The insulation can also be used with unloaded cables as well as with cables which are constantly loaded with magnetic material according to Krarup. In the latter case the liquid insulating material in deep sea cables can also act as pressure equalizing means. In each case a cable with the new insulation has substantially better electrical contents than one of the known cables with thermoplastic insulation.

If cables are employed having return conductors laid concentrically around the conductors, it is advisable to arrange the copper bands, wires or wire gauze acting as return conductor directly over the distancing member and under the watertight outer covering. Then, in the space between the outward and return conductors, there is only insulating material of good electrical properties, more particularly small dielectric losses. The return conductor bands are preferably placed over the distancing member with a long pitch opposite to that of the distancing member. Above the concentric return conductor is a covering of any desired material which is impermeable to water and preferably thermoplastic. The return conductor can be conductively connected at intervals with the armouring, that is, with the sea-water.

A cable according to the invention is illustrated by way of example in the accompanying drawing, in which Fig. 1 shows a cable in which the outer covering is partialy removed and Fig. 2 a cross-section through the cable, while Fig. 3 shows a cable with concentrically arranged return conductors.

In the drawing, $a$ is the stranded conductor, $b$ the distancing cord, $c$ the liquid insulating material, $d$ the covering of thermoplastic material, $e$ the concentrically arranged return conductor and $f$ the armouring wires. In Figs. 1 and 2 the armouring which is of course essential is omitted for the sake of simplicity.

What we claim is:

A submarine signaling cable with insulation consisting of several layers comprising a layer next to the conductors consisting of a liquid insulating material with low dielectric losses and low dielectric constant, a covering thereover of insulating thermoplastic material which is impermeable to water and retains its shape and a distancing member of pure polystyrol in the inner layer for holding the covering from the conductors.

JULIUS ENGLER.
ERNST STUDT.